US009415931B2

United States Patent
Gerbaulet et al.

(10) Patent No.: US 9,415,931 B2
(45) Date of Patent: Aug. 16, 2016

(54) CAPSULE FOR THE PREPARATION OF A BEVERAGE BY CENTRIFUGATION AND METHOD OF PREPARATION USING SUCH CAPSULE

(75) Inventors: Arnaud Gerbaulet, Oye et Pallet (FR); Daniel Abegglen, Rances (CH); Alexandre Perentes, Lausanne (CH); Jean-Francois Tinembart, Yverdon (CH)

(73) Assignee: Nestec S.A., Vevey (CH)

( * ) Notice: Subject to any disclaimer, the term of this patent is extended or adjusted under 35 U.S.C. 154(b) by 595 days.

(21) Appl. No.: 13/982,156

(22) PCT Filed: Jan. 10, 2012

(86) PCT No.: PCT/EP2012/050272
§ 371 (c)(1),
(2), (4) Date: Jul. 26, 2013

(87) PCT Pub. No.: WO2012/100977
PCT Pub. Date: Aug. 2, 2012

(65) Prior Publication Data
US 2013/0309364 A1 Nov. 21, 2013

(30) Foreign Application Priority Data
Jan. 27, 2011 (EP) .................................... 11152382

(51) Int. Cl.
*B65D 85/804* (2006.01)
*A47J 31/22* (2006.01)

(52) U.S. Cl.
CPC ............. *B65D 85/8043* (2013.01); *A47J 31/22* (2013.01)

(58) Field of Classification Search
CPC .............................. B65D 85/8043; A47J 31/22
See application file for complete search history.

(56) References Cited

FOREIGN PATENT DOCUMENTS

WO    WO2010063644    6/2010
WO    WO2010066705    6/2010

*Primary Examiner* — Erik Kasinikow
*Assistant Examiner* — Chaim Smith
(74) *Attorney, Agent, or Firm* — K&L Gates LLP

(57) ABSTRACT

Capsule (1) for the preparation of a beverage in a centrifugal brewing device by feeding liquid in the capsule and rotating the capsule (1) along a rotational axis "I" in the device to produce centrifugal forces on the liquid and forcing a beverage out of the capsule, wherein the capsule (1) comprises containment walls containing beverage ingredients; said containment walls comprising a bottom wall (2), a widening sidewall (3) and a top wall (4), said top wall (4) comprising at least one liquid-impervious area (7) and at least one liquid-pervious and beverage filtering area (5); wherein the liquid-pervious and beverage filtering area (5) is peripherally positioned on the top wall (4) relative to the liquid-impervious area (7) and wherein the liquid-pervious and beverage filtering area is made of a porous flexible material which is extensible at least in axial direction and has a tensile elongation of at least 250, preferably at least 300% (DIN EN 29073-3).

16 Claims, 3 Drawing Sheets

CAPSULE FOR THE PREPARATION OF A BEVERAGE BY CENTRIFUGATION AND METHOD OF PREPARATION USING SUCH CAPSULE

CROSS REFERENCE TO RELATED APPLICATIONS

The present application is a National Stage of International Application No. PCT/EP2012/050272, filed on Jan. 10, 2012, which claims priority to European Patent Application No. 11152382.5, filed Jan. 27, 2011, the entire contents of which are being incorporated herein by reference.

FIELD OF THE INVENTION

The present invention relates to the field of portioned beverage using capsules for preparing a beverage in a beverage brewing device. The invention more particularly relates to an improved capsule and a method for preparing the beverage.

BACKGROUND

The preparation of a beverage by a capsule containing beverage ingredients is known. In general, the capsule is inserted in a beverage production device, such as a coffee machine, liquid is fed in the capsule, the liquid interacts with the beverage ingredients and a beverage is extracted from the capsule under pressure or by gravity.

The preparation of a beverage by using the centrifugation is known. The principle mainly consists in providing beverage ingredients in a container of the capsule, feeding liquid in the receptacle and rotating the receptacle at elevated speed to ensure interaction of liquid with ingredients while creating a gradient of pressure of liquid in the receptacle; such pressure increasing gradually from the centre towards the periphery of the receptacle. As liquid traverses the ingredients, such as ground coffee, extraction of the food compounds takes place and a liquid extract is obtained that flows out at the periphery of the receptacle.

The term "capsule" refers to any flexible, rigid or semi-rigid packaging container containing beverage ingredients. Other synonyms to a capsule are: "pod", "pad", "cartridge" or "sachet". The capsule can be designed for a single use. The container can also be filled with ingredients by the user to form the capsule just before use.

The term "ingredients" means any suitable beverage substance such as ground coffee, soluble coffee, leaf tea, soluble tea, herbal tea, dairy powder, culinary powder, baby food, other beverage nutritional ingredients and any combinations thereof.

A capsule system and method for preparing a beverage from a capsule using centrifugation forces is described in the following documents: EP2210539, WO2008/148604, WO2008148650, WO2008/148646, WO2008/148656 and WO2010/026045.

It is known to use a capsule in a beverage brewing device using centrifugation wherein a closing wall of the capsule is removed or perforated for enabling insertion of beverage extracting means.

In WO 2008/148834, a capsule is proposed with a lid comprising a series of outlets at its periphery; the capsule being closed by a membrane. The membrane can be pierced, cut or removed by the user for uncovering the outlets before the capsule is inserted in the centrifugal brewing device. In particular, the device comprises perforating (extraction) element for perforating peripheral outlets in the membrane thereby enabling beverage release out of the capsule. The lid comprises an annular recess to ensure that only the membrane is perforated by the perforating (extraction) elements of the device but the lid is not damaged, in particular, no undesired opening is provided in the lid. A disadvantage is that this capsule requires the assembling of many elements and is relatively expensive to produce. Another disadvantage is that the internal volume of the capsule is reduced by virtue of the recessed portion of the lid which is required to prevent the perforation of the lid in the device by the perforating (extraction) elements.

Other documents of background are WO 2010/066705A1 and WO 2010/063644 which relate to a capsule for the preparation of a beverage in a centrifugal brewing device by feeding liquid in the capsule and rotating the capsule along a rotational axis in the device to produce centrifugal forces on the liquid and forcing a beverage out of the capsule, wherein the capsule comprises containment walls containing beverage ingredients; said containment walls comprising a bottom wall, a widening sidewall and a top wall.

There is a need for providing an alternative capsule which is adapted to deliver a beverage by the method of centrifugation but which is simpler and less expensive to produce than the capsule of the prior art and which also optimizes the volume available for the beverage ingredients.

SUMMARY OF THE INVENTION

For this, the invention is generally defined by the appended claims.

More particularly, the invention relates to a capsule for the preparation of a beverage in a centrifugal brewing device by feeding liquid in the capsule and rotating the capsule along a rotational axis in the device to produce centrifugal forces on the liquid and forcing a beverage out of the capsule, wherein the capsule comprises containment walls containing beverage ingredients; said containment walls comprising a bottom wall, a widening sidewall and a top wall, said top wall comprising at least one liquid-impervious area and at least one liquid-pervious and beverage filtering area; wherein the liquid-pervious and beverage filtering area is annular and is peripherally positioned on the top wall relative to the liquid-impervious area and wherein the liquid-pervious and beverage filtering area is made of a porous flexible material and has a elongation at break of at least 250%, preferably at least 300% (DIN EN 29073-3).

The "axial direction" means here any direction parallel to the central axis of the capsule intended to form the rotational axis "I".

The invention further relates to a method for preparing a beverage in a centrifugal device by use of a capsule as aforementioned, wherein the capsule is received in a capsule holder and a liquid interfacing system is engaged on the top wall for feeding liquid in the capsule, wherein the capsule is driven in rotation along its central axis "I" for providing centrifugal forces enabling liquid to traverse the beverage ingredients and leave the capsule in said liquid pervious area.

The liquid pervious area can be forced to stretch in the axial direction by a series extracting members protruding from the liquid interfacing system in direction of the top wall of the capsule. Due to the sufficient elongation properties of the material constituting the liquid pervious area, the material sufficiently resists to puncture so that there is no creation of large perforation through which solid particles (e.g., coffee grains) could leak out of the capsule.

DETAILED DESCRIPTION

Figure 1:
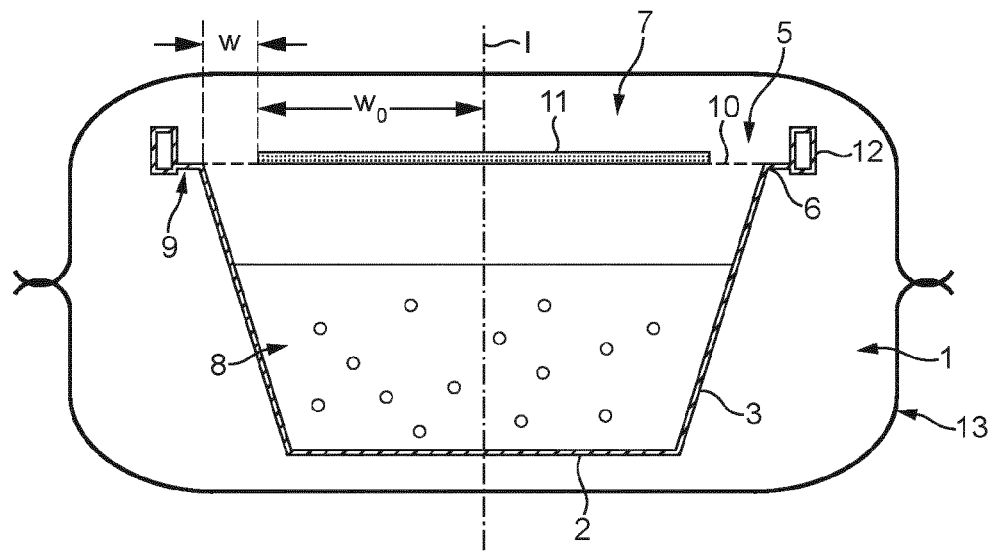
FIG. 1 illustrates a capsule in schematic representation in an individual gas-tight package.

The invention essentially relates to a capsule for the preparation of a beverage in a centrifugal brewing device by feeding liquid in the capsule and rotating the capsule along a rotational axis in the device to produce centrifugal forces on the liquid and forcing a beverage out of the capsule. The capsule comprises containment walls containing beverage ingredients. The containment walls comprises a bottom wall, a widening sidewall and a top wall of preferably larger cross-section than the bottom wall, said top wall comprising at least one liquid-impervious area and at least one liquid-pervious and beverage filtering area; wherein the liquid-pervious and beverage filtering area is preferably annular and is peripherally positioned on the top wall relative to the liquid-impervious area and central axis and wherein the liquid-pervious and beverage filtering area is made of a porous flexible material which has an elongation at break of at least 250%, preferably at least 300%. Preferably, the said elongation at break is comprised between 280% and 1000%, most preferably between 300% and 700%. The elongation at break can be determined by following the international standard DIN EN 29073-3—"Textiles; test method for nonwovens; part 3: determination of tensile strength and elongation".

Resulting from such elongational characteristics, the capsule is provided with a dedicated filtering area positioned in a strategic area where the centrifugal forces are maximal during extraction; such area being designed to stretch without rupturing when engaged by the perforating (extraction) elements of the device when the capsule is inserted in the beverage preparation device but also resisting to the pressure of liquid exerted from the inside of the capsule. The tear resistance is such that a filtering of the beverage is guaranteed.

Preferably, the liquid-pervious area is designed to be relatively flat along a plane substantially normal to the axis of rotation "I".

The liquid-pervious area preferably is selected amongst the group of: synthetic fabric, elastomeric fibers, natural origin fibers, filter paper, and combinations thereof.

In the preferred mode, the liquid-pervious area is made of a fabric. The fabric can be woven and/or non-woven. A fabric provides the advantage of providing suitable beverage filtering properties, a low cost and an ease of sealing with the other elements of the capsule which can be made of different materials. The fabric has preferably a weight per surface unit comprised between 100 and 300 gram/m$^2$, most preferably between 140 and 300 gram/m$^2$ as measured by DIN53854 standard. The weight-per-surface-unit influences the beverage flow resistance and the filtering properties. The higher this ratio the fabric is, the greater the resistance to the flow is. A higher flow resistance directly increases the pressure gradient in the capsule and therefore provides in particular better coffee extraction results (i.e., higher total solids and yield values). In particular, the fabric is a melt-blown or spun-bond fabric. Preferably, the liquid-pervious area is made of a material selected from polyurethane, polyethylene, polypropylene, copolymers of polyethylene, copolymers of polypropylene, polyester and combinations thereof.

Most preferably, the material is preferably polyurethane elastomer or polyolefin plastomer. Preferred polyeolefin plastomer is ethylene alpha olefin copolymers such as EXACT™ produced by ExxonMobil Chemicals or AFFINITY® produced by The Dow Chemical Company or polypropylene elastomer such as VISTAMAXX™ produced by ExxonMobil Chemicals. These polymers have elastomeric properties. VISTAMAXX™ are polyolefin elastomers with isotactic polypropylene crystallinity and contains a predominant amount of polypropylene (more than 80%) with isotactic polypropylene crystallinity, with the balance of the composition being ethylene and other alpha-olefins. They are highly elastic. The elastomer has an elasticity which is related to the molecular weight and composition. The lower the crystallinity and the higher the molecular weight, the higher the elasticity of the fabric. In particular, melt-blown elastomers provides an elongation which may be of about 300-500%.

The liquid-impervious area is formed by an annular or circular disc of liquid-impervious material sealed onto the fabric. The fabric may cover all or part of the top wall. The fabric can therefore overlap with the disc of liquid-impervious material in all or part of the liquid-impervious area of the top wall. When the disc is annular, a central opening is provided which is also preferably covered by a portion of the fabric to form a central liquid-pervious area. The central opening should be of small surface area, preferably of less than 12 mm$^2$. The central opening facilitates the perforation of the top wall by a central liquid injector. Therefore, the fabric in the central area may still remain easier to perforate than the material of the disc. For this, the injector is usually provided with a sufficient length to ensure perforation of the fabric.

Figure 2:
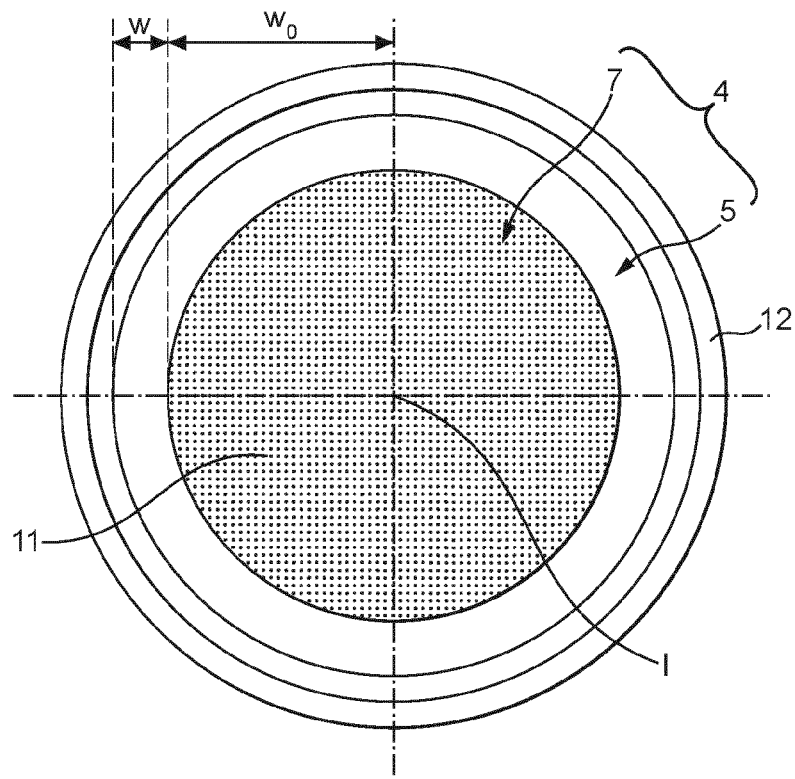
FIG. 2 shows the capsule of FIG. 1 in top view.

As illustrated in FIGS. 1 and 2, the liquid-pervious area 5 extends from the top internal edge 6 of the capsule 1 joining the sidewall 3 along a certain radial width "w". The radial width "w" of the liquid-pervious area is smaller than the radial width "$W_0$" of the liquid-impervious area 7. Indeed, it is important to restrict the outlet surface area of the capsule to the area of larger diameter in order to maximize the flow path in the mass of ingredients. A too large radial width of the liquid-pervious area 5 would be prone to liquid by-pass resulting in an insufficient interaction of liquid with the ingredients, in particular, the ingredients 8 located at the periphery of the capsule. More preferably, the liquid-pervious area 5 extends along a radial width "w" comprised between 2.5 and 15 mm, most preferably, between 3 and 12 mm.

The top wall may further be covered by a gas barrier flexible membrane. The membrane may be perforated or removably sealed to the top wall and/or flange of the body. The membrane may be formed of a mono- or multi-layer foil such as aluminium, metalized polymer, PET-PP laminates including EVOH.

In a preferred configuration of the capsule, the sidewall and bottom wall form a relatively rigid body extending by a flange onto which is sealed the top wall. The advantage is that the beverage and liquid flow is properly funneled to the exit area of the capsule. The flange also provides a part capable of being engaged by the device to form a valve which restricts the flow conditions and creates a gradient of pressure in the capsule. For example, the body is made of aluminium, plastic, paper-polymer laminate, starch-based polymer and combinations thereof. The thickness of the body is preferably comprised between 0.3 and 4 mm. When made of plastic, the body can be formed by thermoforming, injection-moulding or blow moulding. Typical plastic can be polypropylene, polyethylene, PET-PP laminates, polyester and combinations thereof. The plastic may include gas barrier such EVOH layer(s). When made of aluminium or an aluminium-based laminate (e.g., Aluminium-PP laminate), the body is preferably formed by deep drawing.

Polyester comprises crystallized or semi-crystallized PET (cPET), crystallized or semicrystallized polylactic acid (cPLA) PET (polyethylene terephtalate), PLA (polylactic acid) and combinations thereof.

The fabric material may be formed of multi-layers of different polymers such a layer promoting the sealing of the fabric to form the pod and a layer promoting the beverage filtering or water repellent properties.

The invention will now be illustrated in relation to the drawings.

The capsule 1 of FIGS. 1 and 2 comprises containment walls, in particular, a bottom wall 2, a widening sidewall 3 and a top wall 4. The bottom wall and sidewall may form a convex surface without marked angles. The top wall 4 comprises at least one liquid-impervious area 7 and at least one liquid-pervious and filtering area 5. The liquid-pervious and filtering area 5 is preferably of annular configuration and positioned peripherally (or outwardly) relative to the liquid-impervious area 7. As aforementioned, the liquid pervious and filtering area 5 has an elongation at break of at least 250%, preferably at least 300%.

The bottom wall, sidewall and rim can be formed of one single body. The body may be formed by injection moulding, thermoforming, blow moulding or deep drawings. The top wall, preferably comprising a fabric layer 10, which is sealed onto an outwardly protruding rim 9 of the capsule. The fabric layer covers the cavity of the capsule containing the beverage ingredients. A circular disc 11 of liquid impervious material such as plain plastic (e.g., PP, PE, PA, PET or multi-layers) and/or metal (e.g., aluminium foil) is sealed onto the surface of the fabric layer 10. The sealing may be obtained by heat welding, an adhesive or any other equivalent means.

As mentioned earlier, the liquid-pervious area 5 has a radial width "w" which is smaller than the radial width "$W_0$" of the liquid-impervious area 7. Preferably, the width "w" is several times smaller than the width "$W_0$". In particular, the width "w" is at least 2.5 times smaller than "W", most preferably at least 3 times smaller than "W", e.g., between 3 and 8 times smaller. The width "$W_0$" is measured as the radial distance between the central axis I and the outer edge of the disc. The width "w" is measured as the radial distance between the outer edge of the disc and the top internal edge 6 of the capsule, in particular, the internal edge between the sidewall 3 and the rim 9.

The rim of the capsule 1 comprises an annular protrusion 12 extending parallel to axis I. The protrusion preferably extends above the sealing plane of the rim with the fabric layer 10. The protrusion may further extend axially below the rim (i.e., in the direction of the bottom wall of the capsule).

The capsule 1 is preferably packed in a protective outer package 13 such as a flexible sachet. The package is preferably gastight. It may contain protective gas such as nitrogen and/or $CO_2$ or may have a partial vacuum. The capsule can be packed individually or in a group of two or more capsules in the package 13.

Figure 3:
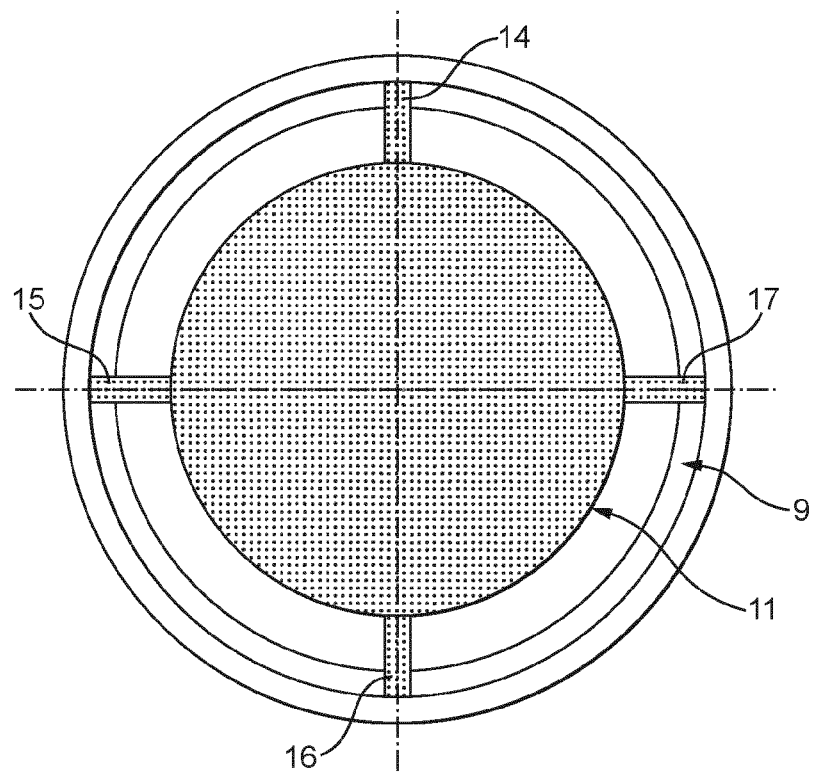
FIG. 3 shows a variant of the capsule of FIG. 2.

FIG. 3 shows a variant of capsule 1. In this mode, the disc 11 extends by radial legs 14-17 which take support onto the rim 9. The advantage lies in that the disc 11 is more rigid when it is perforated by the injection needle along the central axis I.

Figure 4:
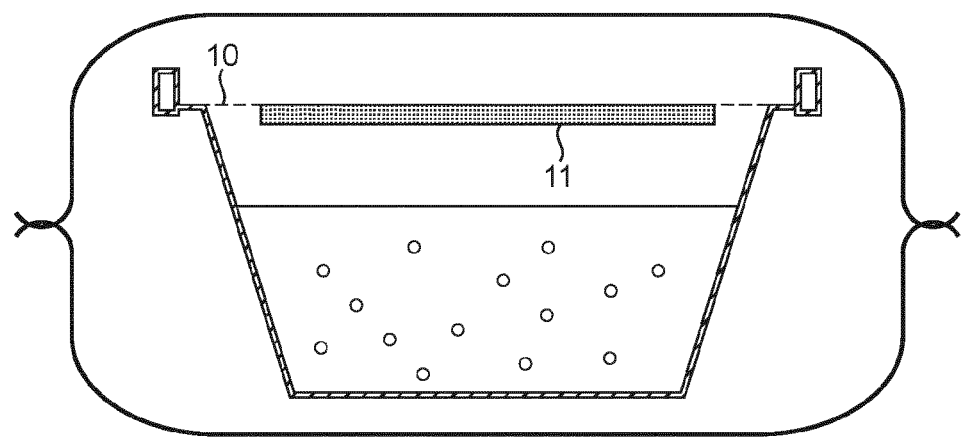
FIG. 4 illustrates a variant of the capsule in schematic representation in an individual gas-tight package.

FIG. 4 shows another variant of the capsule of FIGS. 1-2, in which the liquid-impervious disc 11 is sealed on the internal surface of the fabric layer 10.

Figure 5:
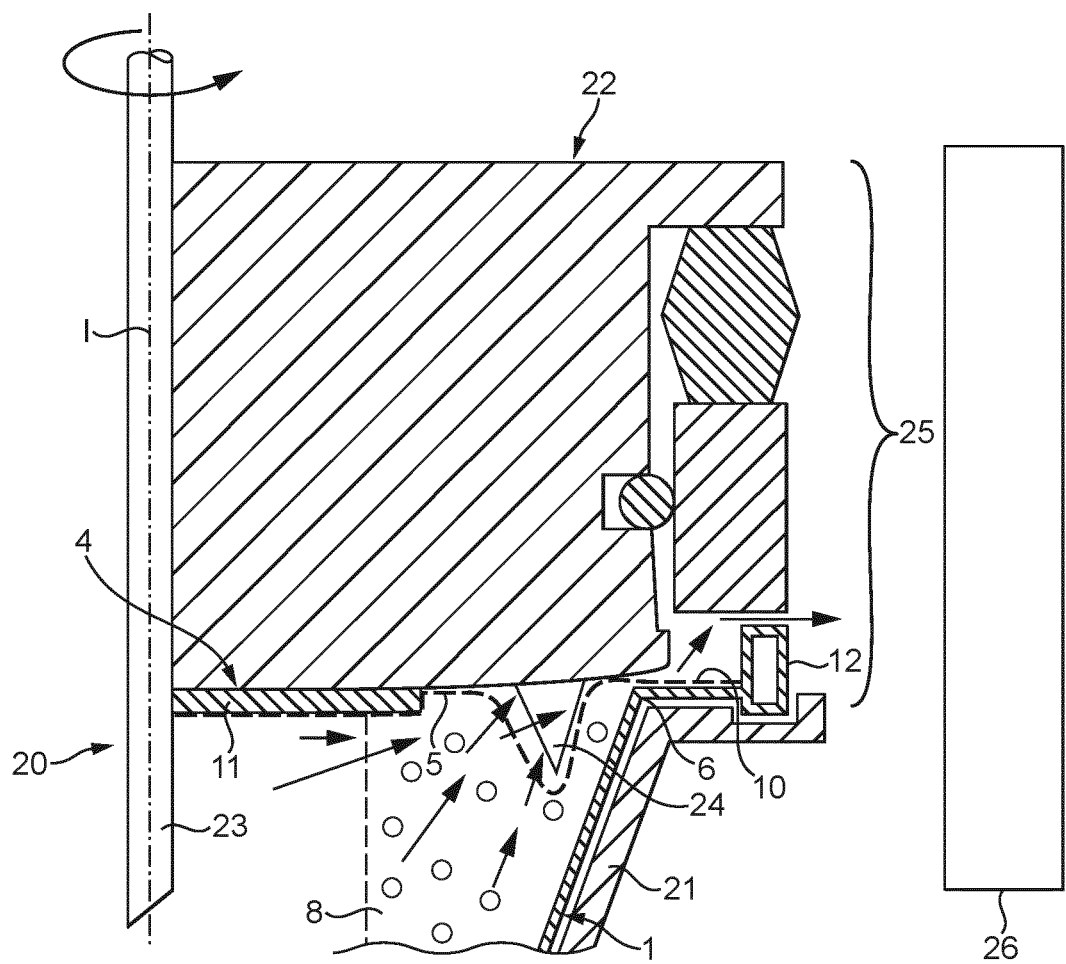
FIG. 5 shows a representation of the capsule of FIGS. 1 to 4 in a beverage preparation device.

FIG. 5 illustrates a centrifugal device 20 during extraction of a capsule 1 according to the invention. The capsule is received in a capsule holder 21 and a liquid interfacing system 22 is firmly engaged on the top wall 4 for feeding liquid in the capsule. The liquid is fed by a central injector 23 along axis I. The injector has preferably the form of a hollow needle to allow liquid (water) to be supplied in the centre of the capsule.

At the periphery of the capsule, the liquid interfacing system comprises a series of extracting members (24) forming elements in relief which are normally used for perforating a membrane of capsules comprising a protective sealing membrane such as described in WO 2008/148834. By virtue of the elongation properties of the fabric covering the pervious area 5 of the capsule, the area is not perforated but stretched sufficiently inwardly by the elements 24 without tearing or creating cracks.

The device may further comprise a spring loaded valve which engages axially against the rim of the capsule, more particularly, against its annular protrusion 12 in order to create a beverage flow restriction means 25 which enables to increase the pressure gradient in the capsule, such as described in WO2010/066705.

The beverage extraction is obtained by driving the capsule in rotation along its central axis "I". The rotation creates centrifugal forces enabling the liquid to traverse the beverage ingredients 8 and to leave the capsule through the liquid-pervious area 5. Therefore, the beverage passes through the openings present in the stretched fabric. The opening surface area may be increased compared to the opening surface area of the fabric before engagement by the elements in relief. However, the individual openings should remain sufficiently small to not allow solid particles, e.g., ground coffee particles, from leaving the capsule. Due to the pressure created by the beverage at the flow restriction means 25, the valve is forced to open and to leave a thin passage for the beverage flow. The flow is centrifuged against an impact wall 26 of the device and then collected to a recipient (e.g., a cup).

Preferably, the disc 4 snuggly fits the needle to create a liquid-tight sealing arrangement with the surface of the needle 23. Therefore, the liquid in the capsule is prevented from leaking out of the capsule through the surface of the needle. The disc can be made of a relatively soft polymer material under normal conditions or a material that softens under the effect of heat and/or liquid (such as PLA). The disc can be made of rubber material, for instance such as EPDM or silicone. If the disc comprises a central inlet port to be more easily traversed by the needle 23, the diameter of the port is preferably slightly lower than the diameter of the needle to provide a tight fit engagement of the needle.

Finally, it should be noted that the amount of beverage ingredients 8 (e.g., coffee powder) in the capsule should be defined in such a manner that during the centrifugation, the width of the compacted mass of ingredients compacting against the internal face of the top wall is larger than the width "w". This characteristic ensures that the liquid traverses the mass of ingredients before it traverses the liquid pervious area 5.

The invention claimed is:

1. Capsule for the preparation of a beverage in a centrifugal brewing device by feeding liquid in the capsule and rotating the capsule along a rotational axis in the device to produce centrifugal forces on the liquid and forcing a beverage out of the capsule, wherein the capsule comprises containment walls containing beverage ingredients; the containment walls comprising a bottom wall, a widening sidewall and a top wall, top wall comprises at least one liquid-impervious area and at least one liquid-pervious and beverage filtering area; wherein the liquid-pervious and beverage filtering area is peripherally positioned on the top wall relative to the liquid-impervious area and wherein the liquid-pervious and beverage filtering area is made of a porous flexible material which has an elongation at break of at least 250%.

2. Capsule according to claim 1, wherein the liquid-pervious area is selected from the group consisting of: synthetic fabric, natural origin fibers, filter paper and combinations thereof.

3. Capsule according to claim 1, wherein the liquid-pervious area is made of a woven fabric and/or non-woven fabric.

4. Capsule according to claim 2, wherein the fabric is a melt-blown or spun-bond fabric.

5. Capsule according to claim 2, wherein the liquid-pervious area is made of a material selected from the group consisting of PU, PE, PP, copolymers of polyethylene, copolymers of polypropylene, polyester and combinations thereof.

6. Capsule according to claim 5, wherein the liquid-pervious area is ethylene alpha olefin copolymer or polypropylene based elastomer.

7. Capsule according to claim 2, wherein the fabric has a weight-per-unit-surface of between 100 and 300 gram/m$^2$.

8. Capsule according to claim 2, wherein the liquid-impervious area is formed by an annular or circular disc of liquid-impervious material sealed onto the layer of fabric.

9. Capsule according to claim 1, wherein the liquid-pervious area extends from the top internal edge of the capsule joining the sidewall.

10. Capsule according to claim 9, wherein the liquid-pervious extends along a smaller radial width than a radial width of the liquid-impervious area.

11. Capsule according to claim 9, wherein the liquid-pervious area extends along a radial width comprised of between 2.5 and 15 mm.

12. Capsule according to claim 1, wherein the sidewall and bottom wall form a relatively rigid body extending by a flange onto which is sealed the top wall.

13. Capsule according to claim 12, wherein the body is made of a material selected from the group consisting of aluminium, plastic, paper-polymer laminate, starch-based polymer and combinations thereof.

14. Capsule according to claim 1, wherein the beverage ingredients are roast and ground coffee.

15. Method for preparing a beverage in a centrifugal device by use of a capsule for the preparation of a beverage in a centrifugal brewing device by feeding liquid in the capsule and rotating the capsule along a rotational axis in the device to produce centrifugal forces on the liquid and forcing a beverage out of the capsule, wherein the capsule comprises containment walls containing beverage ingredients; the containment walls comprising a bottom wall, a widening sidewall and a top wall, top wall comprises at least one liquid-impervious area and at least one liquid-pervious and beverage filtering area; wherein the liquid-pervious and beverage filtering area is peripherally positioned on the top wall relative to the liquid-impervious area and wherein the liquid-pervious and beverage filtering area is made of a porous flexible material which has an elongation at break of at least 250% comprising: placing the capsule in a capsule holder and a liquid interfacing system is engaged on the top wall for feeding liquid in the capsule, rotating the capsule along its central axis for providing centrifugal forces enabling liquid to traverse the beverage ingredients and leave the capsule in the liquid pervious area.

16. Method according to claim 15, wherein the liquid pervious area is forced to stretch in the axial direction by a series extracting members protruding from the liquid interfacing system in a direction of the top wall of the capsule.

* * * * *